(12) United States Patent
Keese (10) Patent No.: US 9,849,594 B2
(45) Date of Patent: Dec. 26, 2017

(54) PARTING DEVICE AND PARTING METHOD

(71) Applicant: KUKA SYSTEMS GMBH, Augsburg (DE)

(72) Inventor: Markus Keese, Kühbach (DE)

(73) Assignee: KUKA SYSTEMS GMBH, Augsburg (DE)

( * ) Notice: Subject to any disclaimer, the term of this patent is extended or adjusted under 35 U.S.C. 154(b) by 365 days.

(21) Appl. No.: 14/388,403

(22) PCT Filed: Mar. 15, 2013

(86) PCT No.: PCT/EP2013/055349
§ 371 (c)(1),
(2) Date: Sep. 26, 2014

(87) PCT Pub. No.: WO2013/143879
PCT Pub. Date: Oct. 3, 2013

(65) Prior Publication Data
US 2015/0328778 A1    Nov. 19, 2015

(30) Foreign Application Priority Data
Mar. 29, 2012   (DE) .................... 20 2012 101 121 U (51) Int. Cl.
*B25J 11/00* (2006.01)
*B25J 13/08* (2006.01)
*B26F 1/44* (2006.01)
*B26D 7/08* (2006.01)

(52) U.S. Cl.
CPC ............ *B25J 11/006* (2013.01); *B26D 7/086* (2013.01); *B26F 1/44* (2013.01); *Y10T 83/04* (2015.04); *Y10T 83/0405* (2015.04); *Y10T 83/141* (2015.04)

(58) Field of Classification Search
CPC ..... B25J 11/006; B25J 13/084; Y10T 83/141; Y10T 83/0405; Y10T 83/04; B26F 1/44; B26D 7/086
USPC ........................................ 901/2, 9, 41; 83/13
See application file for complete search history.

(56) References Cited

U.S. PATENT DOCUMENTS

| | | | | |
|---|---|---|---|---|
| 6,086,294 | A * | 7/2000 | Danchine | B23C 3/12 407/53 |
| 6,364,888 | B1 * | 4/2002 | Niemeyer | B25J 3/04 348/E13.014 |
| 2005/0240309 | A1 * | 10/2005 | Bischoff | G05B 19/423 700/245 |
| 2009/0171505 | A1 * | 7/2009 | Okazaki | B25J 9/1676 700/258 |
| 2010/0257986 | A1 * | 10/2010 | Borg | B25J 13/085 83/13 |

(Continued)

FOREIGN PATENT DOCUMENTS

| CN | 101909830 A | 12/2010 |
|---|---|---|
| CN | 101909843 A | 12/2010 |

(Continued)

*Primary Examiner* — Omar Flores Sanchez
(74) *Attorney, Agent, or Firm* — McGlew and Tuttle, P.C.

(57) ABSTRACT

A parting device and a parting method are provided, in particular for trimming workpieces (2), in particular solar modules. The parting device has a multi-member (12, 13, 14, 15) programmable robot (6) which is in the form of a tactile robot, in particular a force/torque-regulated robot. The robot guides a parting tool (8) which is in the form of a knife.

17 Claims, 5 Drawing Sheets

(56) References Cited

U.S. PATENT DOCUMENTS

| | | | |
|---|---|---|---|
| 2010/0332016 A1 | 12/2010 | Abrams et al. | |
| 2011/0100178 A1* | 5/2011 | Tanaka | B26D 1/0006 83/78 |
| 2013/0037212 A1* | 2/2013 | Maischberger | B23P 19/047 156/322 |

FOREIGN PATENT DOCUMENTS

| | | |
|---|---|---|
| CN | 102160290 A | 8/2011 |
| DE | 20 2006 002 160 U1 | 3/2007 |
| DE | 10 2007 024 318 A1 | 12/2008 |
| DE | 10 2007 060 680 A1 | 6/2009 |
| DE | 20 2008 002 669 U1 | 7/2009 |
| DE | 10 2009 042702 A1 | 3/2011 |
| DE | 20 2010 005 313 U1 | 10/2011 |
| DE | 20 2010 008808 U1 | 1/2012 |
| EP | 2 087 971 A2 | 8/2009 |
| EP | 2 226 172 A1 | 9/2010 |
| WO | 98/35424 A1 | 8/1998 |
| WO | 2011/082755 A1 | 7/2011 |
| WO | 2011/134994 A1 | 11/2011 |

* cited by examiner

PARTING DEVICE AND PARTING METHOD

CROSS REFERENCE TO RELATED APPLICATIONS

This application is a United States National Phase Application of International Application PCT/EP2013/055349 filed Mar. 15, 2013 and claims the benefit of priority under 35 U.S.C. §119 of German Utility Model DE 20 2012 101 121.2 filed Mar. 29, 2012, the entire contents of which are incorporated herein by reference.

FIELD OF THE INVENTION

The present invention pertains to a parting device means, especially a trimming device with a multimember programmable robot and with a parting tool, and a parting method especially a trimming method for workpieces, especially solar modules, with a multimember programmable robot and with a parting tool.

BACKGROUND OF THE INVENTION

A trimming device for a projecting film edge on solar modules, which has a multiaxial robot with position-controlled axes and a parting tool with a plurality of cutting wires lined up in the manner of a comb, is known from DE 20 2008 002 669 U1. The parting tool is fed to the workpiece at right angles to the extension of the edge and cuts the excess at several points. The comb-like parting tool can be aligned in parallel with the edge of the workpiece by means of a compensating means, e.g., by means of a pivoting motion. The parting tool is subsequently moved along the edge of the module and it cuts off the excess of the film.

SUMMARY OF THE INVENTION

An object of the present invention is to provide a perfected parting means and a parting method.

According to the invention, a parting device, especially trimming device, is provided with a multimember programmable robot and with a parting tool. The robot is designed as a tactile robot, especially a force/torque-regulated robot. The parting tool is designed as a knife.

According to another aspect of the invention, a method for parting is provided, especially trimming, workpieces, such as for example solar modules. A multimember programmable robot is provided with a parting tool. The parting tool is designed as a knife and is guided by a tactile robot, especially a force/torque-regulated robot.

The use of a multiaxial tactile robot with preferably force-controlled or force-regulated and torque-controlled or torque-regulated robot axes offers various advantages. On the one hand, the robot can respond to mechanical resistances and yield when needed. Damage to the workpiece can be avoided hereby. The feeding force can be maintained and the parting process can be optimized. In addition, the robot can be used to detect the position. Furthermore, the wear of the tool is reduced.

The tactile robot is especially suitable for guiding a mechanical parting tool. The parting tool may be designed as a knife. This may have an individual cutting edge, which possibly performs superimposed movements of its own during the feeding and/or cutting operation. The parting tool requires an especially low design effort and has an especially low cost. A knife has advantages over the heating wires or laser beams known in the state of the art, which partially melt the material during parting and possibly generate harmful gases or particles. Heating wires may, in addition, be subject to increased wear. A parting knife does not have these drawbacks, but wear may develop in case of a parting knife as well. However, the robot being claimed makes possible an automatic wear compensation by a corresponding adjustment of the parting tool.

The parting means may have a sensor system for detecting a reference point, especially an edge, on the workpiece. It is favorable for this if this is an edge-scanning sensor system. It is especially advantageous to arrange the sensor system in or at the robot.

Arrangement of the sensor at the parting tool or between the robot and the parting tool is also possible. The sensor system makes possible an accurate feeding of the parting tool to an edge of the workpiece. This is especially favorable for trimming and cutting off a lateral excess, especially an excess of film, on a workpiece, especially a plate-shaped solar module. The sensor system already present in or at the robot may be advantageously used for the edge-scanning function. This offers a possibility of technical and economic optimization. The sensor system can be used for checking the position and the process not only during the feeding of a parting tool, but also in the further course of the parting motion.

A tactile, especially force/torque-regulated robot is especially well suited for reliably guiding and positioning the parting tool before and during the parting process. Furthermore, it reduces the effort required for safety. The robot may also apply defined forces, e.g., for guiding and possibly pressing on a parting tool. The energy and operating materials may be supplied for the parting tool from the outside or possibly from the robot, e.g., through lines passing through the hollow shafts of the robot.

In addition, the robot may carry out motions of the parting tool, especially a parting knife, which are favorable for the parting process. In particular, pulling cuts are possible. The robot can likewise avoid or at least substantially reduce damage to the workpiece.

The robot may be advantageously designed to carry out a vibrating motion, especially during the feeding of the parting tool. As an alternative or in addition, the parting tool may be designed as a vibrating tool, especially as a vibrator knife.

To detect a reference point on the workpiece, especially an edge of the workpiece, a vibrating motion of the robot and/or of the parting tool may be favorable during the feeding to the working site, especially at an excess to be cut off. This facilitates and improves the accuracy of detection during the edge detection. A vibrating motion of the robot and/or of the parting tool at right angles or obliquely to the direction of feed may likewise be advantageous and may optimize especially the further cutting process after the feeding has been performed. This vibrating motion may be performed alternatively or in addition to the feeding vibration.

The working range of the robot can be increased by means of a moving means, which ensures a relative motion between the workpiece and the robot. The moving means and the robot may be connected to a control, especially to a robot control.

The present invention is schematically shown in the drawings as an example. The various features of novelty which characterize the invention are pointed out with particularity in the claims annexed to and forming a part of this disclosure. For a better understanding of the invention, its operating advantages and specific objects attained by its

DESCRIPTION OF THE PREFERRED EMBODIMENTS

Referring to the drawings in particular, the present invention pertains to a parting device (1), especially a trimming device, as well as a parting method.

The parting device (1) has at least one multiaxial and programmable robot (6), which is designed as a tactile robot and which guides a parting tool (8). The robot (6) is connected to a robot control (11). The tactile robot may have an integrated sensor system (18) suggested in the drawings for detecting forces and/or torques acting from the outside, which is connected with the robot control (11) and is used to control or regulate the motions of the robot. The tactile robot may have especially force- or torque-regulated axes. It may also be designed as a lightweight robot.

The workpiece (2) has, e.g., the shape of a plate and may be designed, e.g., as a solar module. It has, e.g., a prismatic, especially rectangular shape with a plurality of straight edges (3). A solar module (2) may have a multilayer design. It may have, e.g., a central layer with a matrix consisting of solar cells connected in an electrically conductive manner as well as bilateral connecting and cover layers, especially a transparent front panel and a nontransparent back layer or back film. A solar module (2) may have an excess (4) projecting laterally over the edge or edges (3) of the multilayer film. The excess (4) may be, e.g., a film excess of a back film or of an intermediate film of the solar module (2). The excess (4) may be softer or have a lower strength than the other parts and especially the edge (3) of the workpiece (2).

In the embodiment being shown, the solar module (2) is trimmed at the edges (3), and the corresponding excess (4) can be cut off along the edge (3) and preferably flush with the edge surface. As an alternative, any other desirable parting process is possible, which may include, e.g., the cutting in of recesses or the cutting through of the workpiece (2) or the cutting off of parts of the workpiece.

The workpiece (2) may rest on a support (5), e.g., a table or a frame during the processing. A conveyor (21) may be provided for feeding. The workpiece (2) may be stopped during the processing. As an alternative, it may be moved during the processing by means of a moving means (19) relative to the robot (6). The moving means (19) may be formed by the conveyor (21) or a section of the conveyor (21). As an alternative, the moving means (19) may be a separate device, which is designed, e.g., as a linear conveyor or as a rotary table or the like. It may also be formed by another robot.

Figure 2:
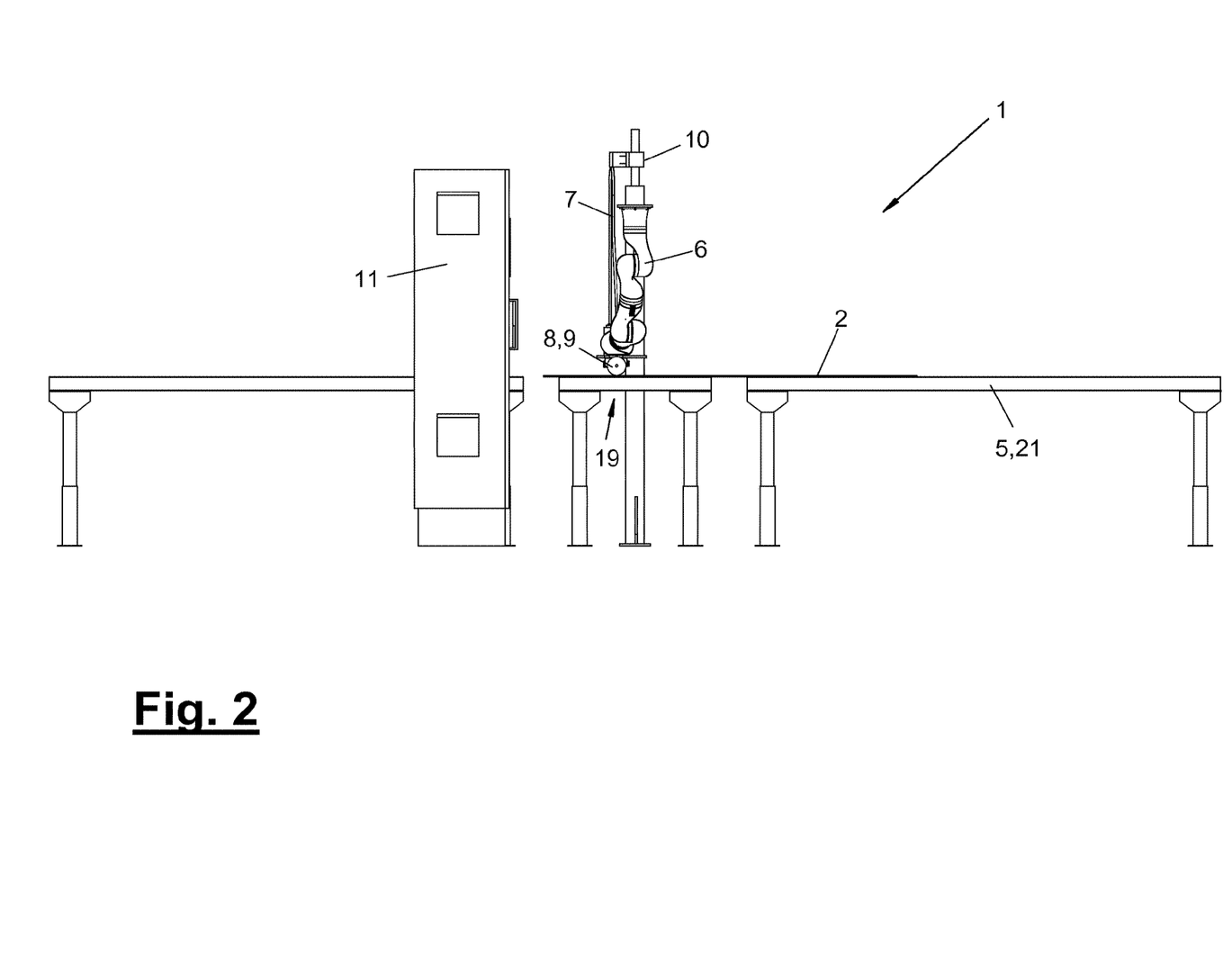
FIG. 2 is a side view of a parting device with a robot and with a parting.

The support (5) has, according to FIG. 2, a recess or interruption for the passage of the parting tool (8) in the area of the intended parting site(s) on the workpiece (2). The workpiece (2) may be approximately positioned for the parting process. The robot (6) is able to find the workpiece position automatically and to carry out the programmed parting process in the correct position.

The robot (6) has a plurality of movable members (12, 13, 14, 15), which are connected with one another. The members (12, 13, 14, 15) are preferably connected with one another in an articulated manner and via rotary robot axes I-VII. It is, furthermore, possible that individual members (13, 14) are designed as multipart members and are movable in themselves. The robot (6) is designed in the exemplary embodiment being shown as an articulated arm robot and has seven driven axes or axes of motion I-VII. The axes I-VII are connected with the robot control (11) and can be controlled and possibly regulated. The output-side end link (12) of the robot (6) is designed, e.g., as a robot hand and has an output element (17) rotatable about an axis of rotation (16), e.g., an output flange. The axis of rotation (16) forms the last robot axis VII. One or more lines for operating materials, e.g., power currents and signal currents, fluids, etc., may be led through a possibly hollow output element (17) and possibly other robot members (13, 14, 15) and they exit to the outside at the flange.

The robot (6) preferably has three or more mobile members. In the exemplary embodiment being shown, it has a basic member (15) connected, with the foundation, e.g., a base or frame (7), and the above-mentioned end member (12) as well as two intermediate members (13, 14). The intermediate members (13, 14) are designed as multipart members and are rotatable in themselves by means of axes (III) and (V). As an alternative, the number of intermediate members (13, 14) may be lower or higher. Individual intermediate members (13, 14) or all intermediate members (13, 14) may be designed in another variant as members that rotate in unison in themselves and without an additional axis.

Figure 1:
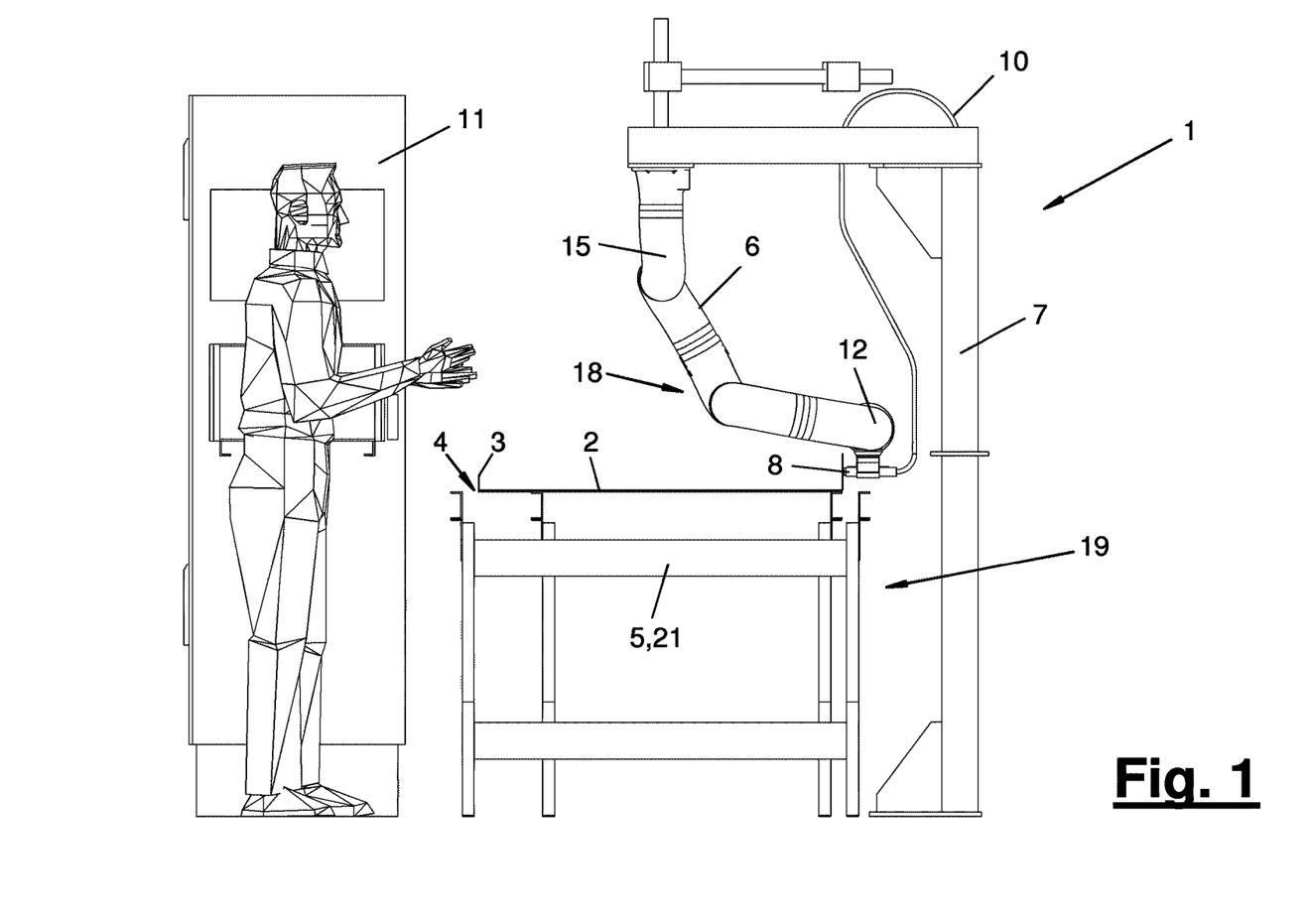
FIG. 1 is a front view of a parting device with a robot and with a parting tool.
Figure 3:
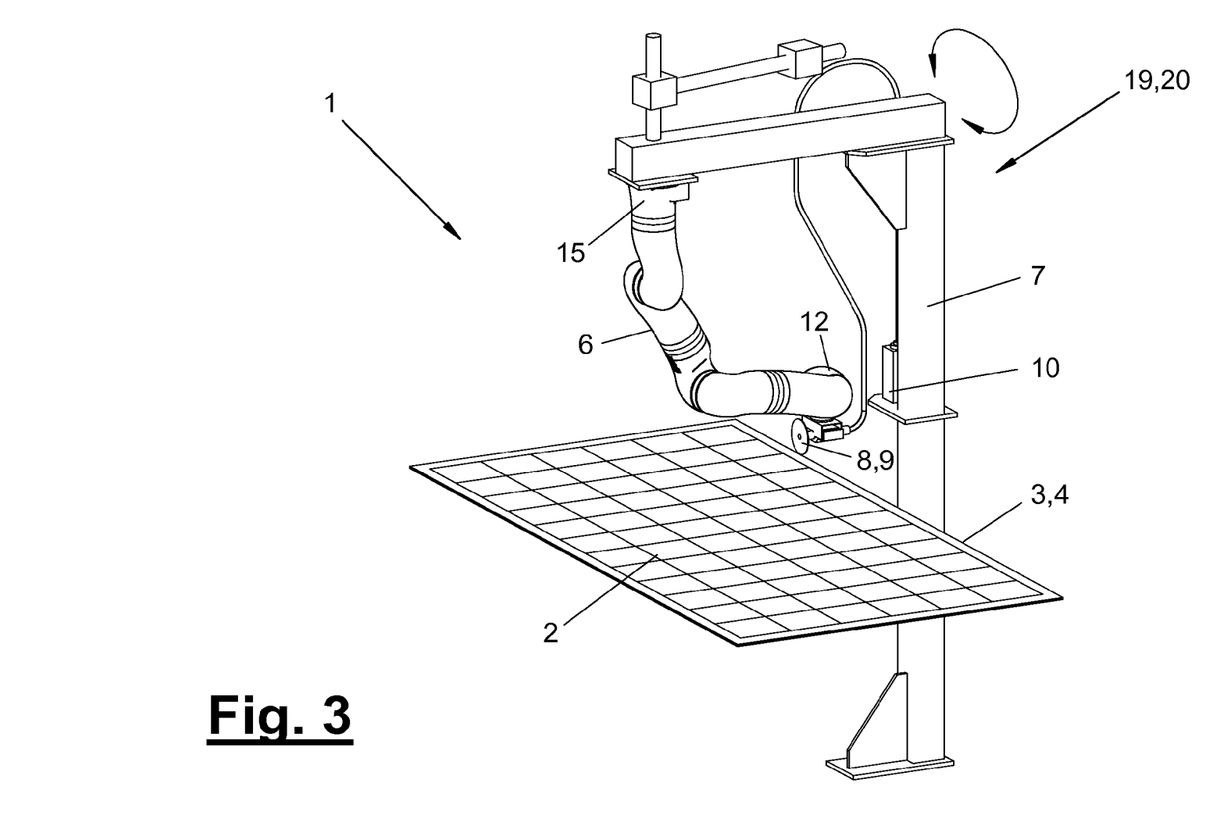
FIG. 3 is a perspective view of the robot with the parting tool at a solar module according to FIGS. 1 and 2.

The robot (6) may be arranged upright or hanging. In the exemplary embodiment according to FIGS. 1 through 3, it is arranged hanging at the frame (7) and approximately centrally above the processing site or the workpiece (2) positioned there.

The robot axes I-VII have a pivot bearing or a hinge each and a controllable, possibly regulatable rotary drive, which is associated with them here and is possible integrated. The axis of rotation (16) is the robot output axis VII in the robot (6) being shown. In addition, the robot axes I-VII may have a controllable or switchable brake and a possibly redundant sensor system, which is/are connected with the robot control. The sensor system may be integrated and may have, e.g., one or more sensors on one or more of the axes I-VII. These sensors may have the same function or different functions. They may be designed especially for detecting acting loads, especially torques. They may, furthermore, detect rotary motions and possible rotary positions. In another embodiment, such a sensor system connected with the robot control (11) may be attached externally to the robot (6), e.g., at an output element (17) or at the parting tool (8). The sensor system may be used in both variants for the parting process in the manner explained below.

The robot (6) may have one or more force-controlled or force-regulated axes (I-VII) or force-controlled or force-regulated axis drives between the members (12, 13, 14, 15). The robot (6) may have now especially one or more flexible axes (I-VII) or flexible axis drives with a flexibility regulation. The flexibility regulation may be a simple force regulation or a combination of a position regulation and a force regulation. Such a flexible axis may be used advantageously for the parting process in different respects. On the one hand, the robot (6) can hold and guide the parting tool (8) elastically in such a way that it is capable of performing yielding motions, as a result of which it is possible to avoid, e.g., crashes and especially accidents with persons. The property may also be used for manual teaching and programming. In addition, the searching for and finding of the working position can be supported and facilitated at the axes (I-VII) with the robot's sensor system by means of a load detection. Angle errors in the relative position of the members (12, 13, 14, 15) can also be detected and corrected as needed.

One or more flexible axes are, in addition, advantageous for adjusting the parting tool (8) corresponding to the feed. The robot (6) may, in addition, apply a defined pressing force. It is likewise favorable for this purpose if the robot (6) has one or more force- and possibly position-regulated axes (I-VII).

As an alternative or in addition, the robot (6) may have one or more driven axes (I-VH) without flexibility and, e.g., with an exact position control or position regulation.

Figure 5:
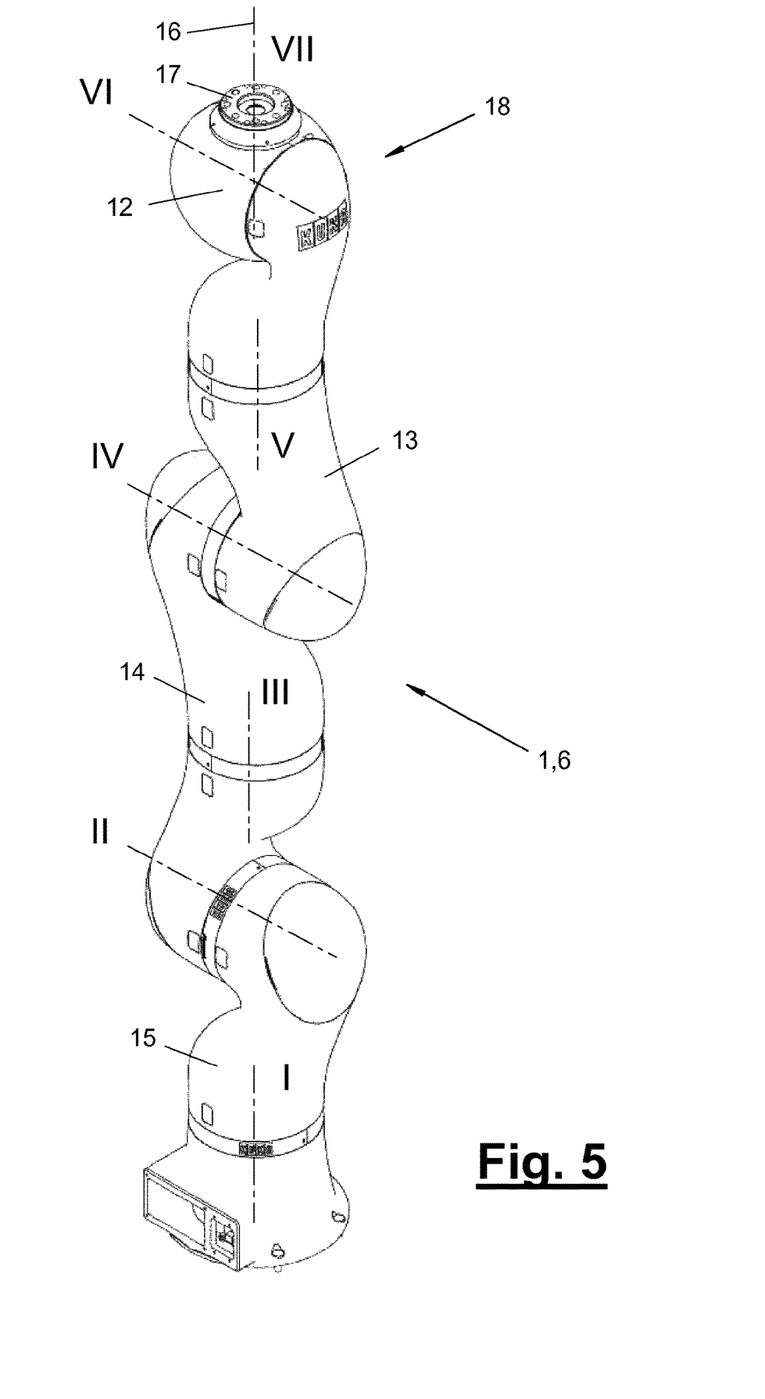
FIG. 5 is a perspective view showing a multimember robot with force-regulated axes I through VII.

FIG. 5 shows the robot (6) of the exemplary embodiment in a stretched position and illustrates the design of the members (12, 13, 14, 15) and of the driven and controllable or regulatable axes (I-VII). The split designs of the elongated intermediate members (13, 14) with the axis of rotation (III) and (VI), which are integrated here, are shown here as well. The supply lines for operating materials are guided in the interior of the members (12, 13, 14, 15), which have, e.g., hollow shafts for this purpose at the hinges or pivot bearings.

The robot (6) shown is designed as a lightweight robot and consists of lightweight materials, e.g., light metals and plastic. It also has a small overall size. The parting tool (8), whose construction and function have been simplified, likewise has a low weight. The robot (6) with its parting tool (8) has, as a result, on the whole, a low weight and can be transported without major effort and displaced from one site of use to another. The weight of the robot (6) and parting tool (8) may be less than 50 kg, especially approximately 30 kg. Due to the possibility of manual teaching, the parting means (1) can be programmed, put into operation and adapted to different parting processes and jobs rapidly and in a simple manner.

The above-mentioned force control or force regulation of the robot axes (I-VII) pertains to the action towards the outside at the output element (17) of the end member (12) as well as to the forces of reaction acting there. Torque control or torque regulation takes place internally within the robot at the rotating axes or axis drives.

The robot (6) is programmable, the robot control (11) having a computing unit, one or more memories for data or programs as well as input and output units. The parting tool (8) and possibly the moving means (19) may be connected with the robot control (11) or another common control and may be implemented in the robot control, e.g., as a controlled axis. The robot control (11) may store process-relevant data, e.g., sensor data and log them for quality control and quality assurance.

The parting tool (8) may have different designs. It is designed as a knife in the exemplary embodiment being shown. The parting tool (8) may have a parting blade (9), especially an individual parting blade. This may be arranged rigidly or movably. The parting knife (8) has a rotating, disk-shaped parting blade (9) with cutting elements at the lateral circumference in the embodiment being shown and is connected with a rotary drive. As an alternative, a parting knife (8) may have an elongated parting blade (9), e.g., a blade, which is arranged rigidly. As an alternative, it may oscillate and have a corresponding drive for this. The parting knife may be replaceable by means of a magazine assembly. The parting knife may also be a hot knife.

Figure 4:
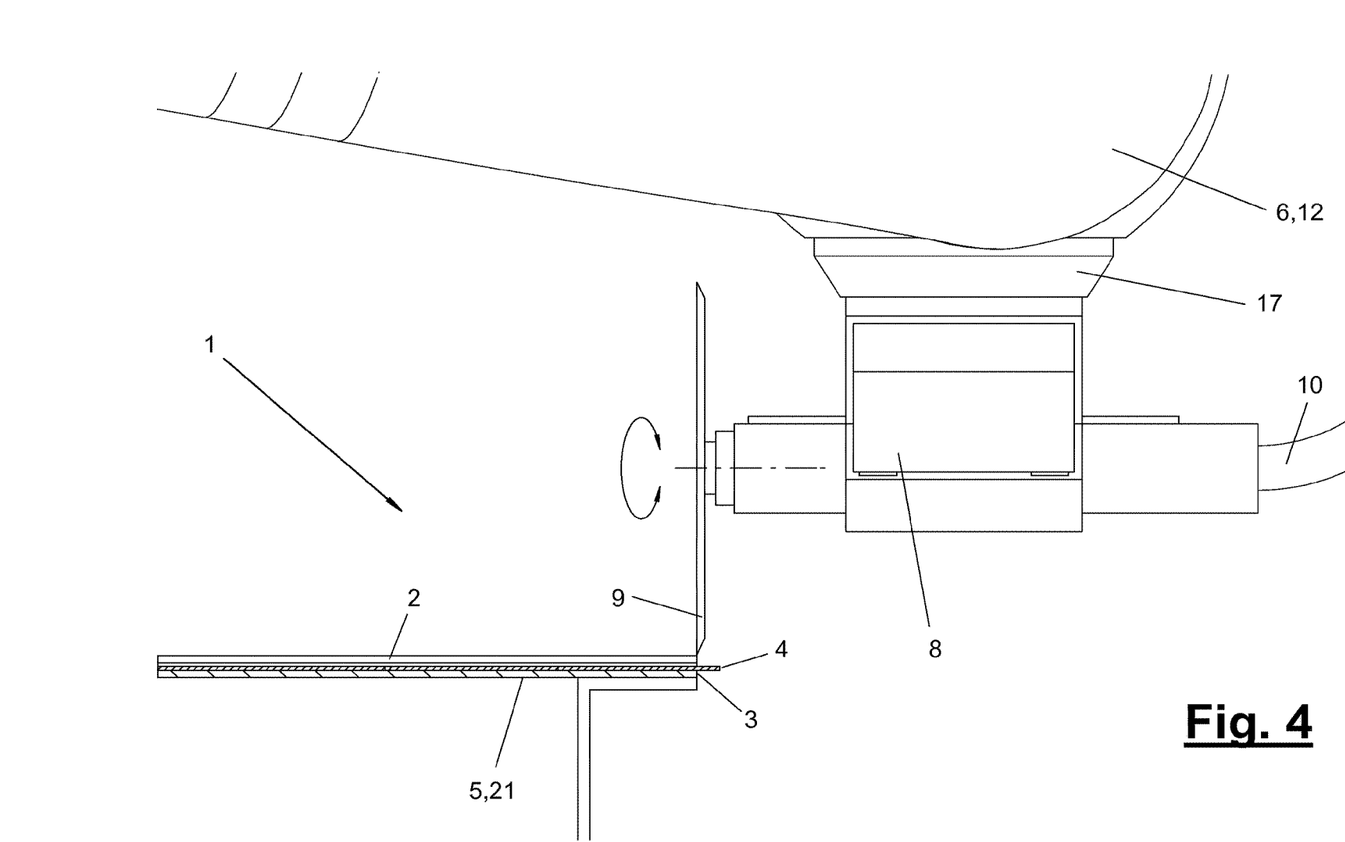
FIG. 4 is a cut-away and enlarged detail of the parting site on the workpiece.

The parting tool (8) has, furthermore, a tool supply unit (10), which may be arranged at a frame (7) of the robot (6) and which feeds the necessary parting materials, e.g., energy, coolant, parting aid or the like to the parting site and to the parting blade (9) or to the drive thereof by means of flexible lines. As is illustrated in FIG. 4, a tool holder, in which the body or the drive of the tool (8) is arranged rigidly or detachably and possibly replaceably, is mounted at the end member (12), especially at the output flange.

The parting means (1) has a sensor system (18), which detects a reference point (3) at a workpiece (2), e.g., the edge of the solar module. The sensor system may be an edge-scanning sensor system. The system (18) may be arranged in the robot (6) and/or in the parting tool (8) in the above-mentioned manner.

The sensor system (18) is arranged in the robot (6) in the embodiment being shown and is formed by the one or more force and/or torque sensors already present there at one or more robot axes I-VH. The robot (6) can detect mechanical resistances by this integrated sensor system (18) during the feeding and guiding of the parting tool (8) during the parting process and report them to the robot control (11), which will then elicit corresponding responses of the robot.

The robot (6) can feed the parting tool (8) to the workpiece edge (3) from the outside, e.g., at the beginning of the parting process and cut into the excess (4) in the process. The feed motion may be directed at right angles or preferably obliquely in relation to the course or the longitudinal extension of the excess (4) and of the edge (3). The edge (3) may be detected from an increase in the mechanical resistance during the feeding. The robot (6) can then reorient the parting tool (8) and carry out the further parting motion along the edge (3). It moves in the process the parting tool (8) along a programmed path. If the course of the edge deviates from the programmed path, this can likewise be detected by the sensor system (18) and compensated by corresponding corrective motions of the robot (6).

The sensor-based detection of the reference point (3) or of the workpiece edge can be facilitated and improved if the parting tool (8) performs a vibrating or trembling motion. The vibrating motion may also be an oscillating, especially sinus or sawtooth-like motion. This can lead to corresponding vibrations of the workpiece (2), especially of the solar module, which make possible a better and more accurate sensor-based detection of the edge. A vibrating motion performed in the direction of feed can be generated in different manners. In the exemplary embodiment being shown, the robot (6) performs such superimposed vibrating or trembling motions during the feed motion. As an alternative or in addition, the parting tool (8) may generate vibrating motions. It may be designed for this, e.g., as a vibrator tool, especially as a vibrator knife. The vibrating motions may be performed, in addition, obliquely or possibly even at right angles to the direction of feed.

In a variant of the exemplary embodiment described, a vibration of the workpiece (2), excited by vibration, can also be detected in another manner, e.g., at the workpiece itself, and, e.g., by an optical sensor system.

A vibrating motion, which is directed at right angles or obliquely in relation to the direction of feed or to the workpiece area or excess (4) to be cut off and is generated by the robot (6) and/or parting tool (8), may also be advantageous for the further parting process, especially for the quality of cut, the tool wear or the like.

To trim the workpiece (2), the robot (6) may place a feeding cut approximately in the middle area of the workpiece edge (3) and guide the trimming tool (8) farther to the end of the edge or to a corner after reaching the edge (3). Eight parting cuts are thus carried out in the four-sided solar module. A further parting cut is then performed at the same edge (3) in the opposite direction. Eight parting cuts are thus carried out in the four-sided solar module (2).

The above-mentioned moving means (19) makes it possible to increase the working range of the robot (6). As an alternative or in addition to a conveying means for the workpiece (2), the moving means (19) may have an additional axis (20) for the robot (6). For example, the column-like frame (7) may be movable for this about one or more axes. It may have, e.g., a pivotable extension arm, on which the robot (6) is mounted hanging.

Based on the tactile, especially force/torque-regulated robot (6) used, the parting means (1) or the station can be removed without protective measures for the staff. A protective means may be necessary for the parting tool only.

Various variants of the embodiments being shown and described are possible. On the one hand, the robot (6) may vary in terms of the number and design of its members (12, 13, 14, 15) and also of its driven axes (I-VII). It may have any desired number and combination of rotatory and/or translatory axes, and the axis drives and mounts of these axes as well as the sensor system probably associated may have correspondingly different designs. The parting tool (8) may also have a different design and consist, e.g., of a tensioned and possibly heated cutting wire.

While specific embodiments of the invention have been shown and described in detail to illustrate the application of the principles of the invention, it will be understood that the invention may be embodied otherwise without departing from such principles.

The invention claimed is:

1. A method for parting and trimming workpieces, the method comprising the steps of:
   providing a multimember programmable and tactile force/torque-regulated robot; and
   providing a parting tool comprising a cutting tool;
   providing a sensor system integrated in the robot, wherein the sensory system has at least one force and/or torque sensor at a robot axis;
   detecting a workpiece edge with the sensor system;
   guiding the cutting tool by the tactile force/torque-regulated robot to feed the cutting tool at a lateral excess portion of the workpiece, obliquely in relation to a course of the excess portion and to move the parting tool along the edge of the workpiece after reaching the workpiece edge based on the detecting of the workpiece edge; and
   performing, with the robot, a vibrating motion directed in a direction of the feed of the cutting tool during an approach to the workpiece and during feeding of the parting tool to the workpiece and during detection of the reference location on the workpiece and during cutting after the feeding of the cutting tool.

2. A method in accordance with claim 1, wherein movement of the robot with respect to one or more axes of the robot is force-controlled or force-regulated or position-controlled and force-regulated.

3. A method in accordance with claim 2, wherein the parting tool is held and guided by the robot elastically in such a way that the parting tool is capable of yielding.

4. A method in accordance with claim 1, wherein:
   the workpiece is plate shaped solar module; and
   the lateral excess is cut off the plate-shaped solar module workpiece.

5. A parting and trimming device comprising:
   a parting tool comprising a cutting tool;
   a multiaxial programmable robot with an associated robot control and force-regulated or torque-regulated axes, the robot moving the cutting tool during a cutting process and the robot generating a vibration motion of the cutting tool; and
   a sensor system associated with the robot, the sensor system detecting forces and/or torques acting on the robot and the robot control controlling or regulating motions of the robot based on the detected forces and/or torques acting on the robot, the sensor system further comprising an edge scanning sensor system detecting an edge of a workpiece and the sensor system comprising at least one forces and/or torques sensor at a robot axis wherein, movement of the robot is forces and/or torques-regulated, wherein the robot is programmed to feed the cutting tool, at a lateral excess portion of the workpiece, obliquely in relation to a course of the excess portion to approach the edge and to feed the parting tool along a direction of the edge of the workpiece, after detecting the edge of the workpiece, and to generate the vibration motion during the approach and feeding of the parting tool to the workpiece and during detection of the edge and during a following cutting process.

6. A parting device in accordance with claim 5, wherein the robot has at least one flexible axis with a flexibility regulation comprising regulating movement and/or regulating force at the flexible axis of the robot with force regulation or with a combination of position regulation and force regulation.

7. A parting device in accordance with claim 5, wherein the parting tool has a single parting blade.

8. A parting device in accordance with claim 5, wherein the parting tool has a movable rotating or oscillating parting blade.

9. A parting device in accordance with claim 5, wherein the robot is programmed to feed the cutting tool at a middle area of the excess and then to move the cutting tool further to an end of the excess along an edge.

10. A parting device in accordance with claim 5, further comprising a moving device moving the workpiece and/or for the robot, wherein the moving device and the robot are connected to the robot control.

11. A parting and trimming device comprising:
   a multimember programmable robot;
   a parting tool; and
   a sensor system integrated in the robot, the sensor system sensing, at the robot and/or at the parting tool, an edge reference to detect a reference location on a workpiece at an edge of the workpiece and the sensor system comprising at least one force and/or torque sensor at a robot axis wherein, the robot is a force/torque-regulated robot, wherein:
   the parting tool comprises a cutting tool; and
   the robot is programmed to feed the parting tool, at a lateral excess portion of the workpiece, obliquely in relation to a course of the excess portion and to move the parting tool along the edge of the workpiece after reaching the edge of the workpiece edge, based on detecting the reference location on the workpiece at the edge of the workpiece and the robot is configured to generate a vibrating motion in a direction of feed which vibrating motion is generated during approach and feeding of the parting tool to the workpiece and during detection of the reference location on the workpiece and during a following cutting process.

12. A parting device in accordance with claim 11, wherein the robot has one or more force-controlled or force-regulated axes.

13. A parting device in accordance with claim 12, wherein the robot has at least one flexible axis with a flexibility regulation comprising regulating movement and/or force of the robot with a force regulation or with a combination of position regulation and force regulation.

14. A parting device in accordance with claim 11, wherein the parting tool has a single parting blade.

15. A parting device in accordance with claim 11, wherein the parting tool has a movable, rotating or oscillating parting blade.

16. A parting device in accordance with claim 11, wherein the robot is programmed to feed the parting tool at a middle area of an excess and then to move the parting tool further to an end of the excess along an edge.

17. A parting device in accordance with claim 11, further comprising:

a robot control; and a moving device moving the workpiece and/or the robot, wherein the moving device and the robot are connected to the robot control.

* * * * *